Aug. 25, 1942.  A. W. KOLSTAD  2,294,348
IMPLEMENT FOR CUTTING BEETS
Filed June 20, 1941
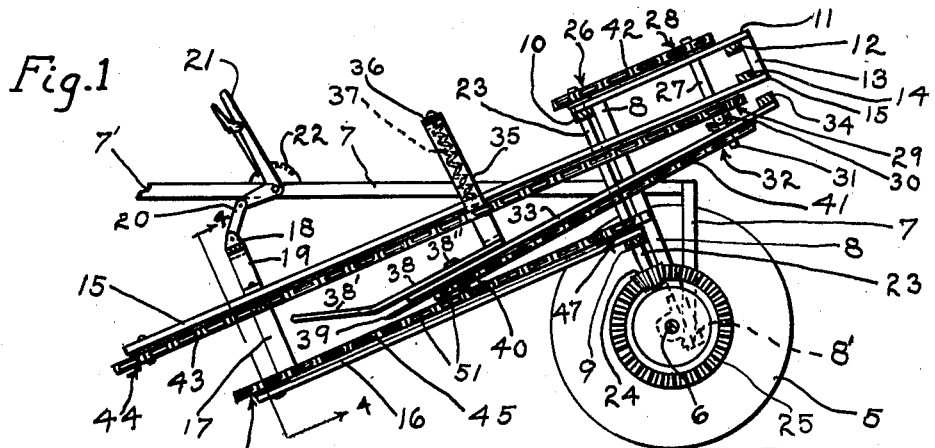
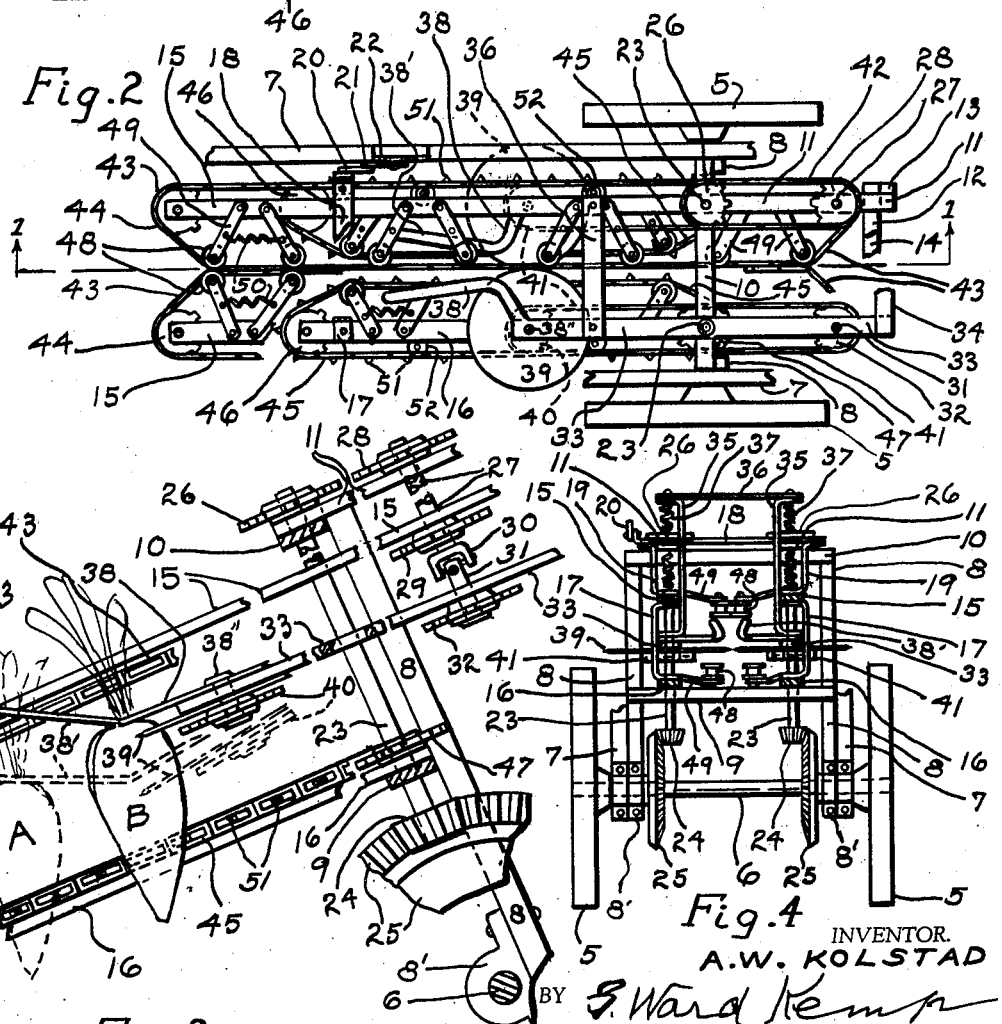
INVENTOR.
A.W. KOLSTAD
BY G. Ward Kemp
ATTORNEY.

Patented Aug. 25, 1942

2,294,348

UNITED STATES PATENT OFFICE 2,294,348

IMPLEMENT FOR CUTTING BEETS

Arnold W. Kolstad, Seattle, Wash., assignor of one-half to Amanda Ougland, Seattle, Wash.

Application June 20, 1941, Serial No. 398,963

3 Claims. (Cl. 55—108)

This invention relates to implements for the slicing off of the upper portions of beets and particularly beets for making sugar.

When successfully raised for making sugar, the beets are frequently from 3 to 6 inches in diameter across the upper portion of the bodies, and their crowns frequently protrude several inches above ground when growing. Such protruding parts are exposed to the weather and are generally formed of tough or hard fibres and carry a bitter taste which seriously impairs the flavor and value of sugar unless removed from the lower portions which are valuable for sugar content. As the beets growing alternately in rows vary materially in spacing and in size and extend above the ground, no machine has heretofore been devised for successfully severing even portions or crowns from each beet, and such work has necessarily been done by manually slicing off the proper sections by knives carried by workmen. This is a slow and laborious process and under present shortages of field laborers, the cost greatly reduces the profits required by farmers to provide the necessary beets for national sugar requirements.

In order to successfully cut off every such hard bitter portion on varying sized beets, with other variations, it is necessary to lift the beets perpendicularly after they have been preferably loosened by plows, and to provide means for guiding and moving the beets along fixed planes with rotary knives along the path of the beets for cutting through the fibres and removing the bitter crowns. It is also important to drop or deposit separately the severed crown and leaves from the valuable beet bodies in different positions.

It is, therefore, among the objects of this invention to provide an implement to lift the beets perpendicularly from the earth as it travels over a row, to carry the beets backward along fixed planes of travel while the crowns of the beets vary in elevation, and to provide knives automatically guided to the proper position for cutting uniform distances beneath the caps of the varying sized beets and to freely rotate the knives in such varying elevations and to deposit the severed portions in different locations. Particular objects are to provide such an implement with travelling wheels with three duplicate sets of rotatable belts in parallel lines one above the other. The uppermost of such belts are for pulling and lifting the beets from the ground by their leaves and moving the same backward; the lower belts for gripping the bodies of the beets and carrying the same along a fixed plane against the knives; the middle belts for rotating two horizontally disposed knives for cutting off the crown of the beets and being mounted on adjustable bars provided with forwardly projected prongs for regulating the elevation of the knives for cutting off uniform lengths from the tops of the beets while the size of the beets vary.

With these and other objects to be hereinafter shown, I have illustratively exemplified my invention by the accompanying drawings of which: Fig. 1 represents a side elevation of the implement taken along lines 1—1 of Fig. 2, showing the complete right-hand half of the duplicate parts of the machine. Fig. 2 is a plan view of the implement showing the right-hand half complete excepting parts of belt tightener springs; and also showing parts of the left-hand half with the upper belt drive and frame and part of the upper belt and frame removed to show the left-hand assembly. Fig. 3 is a detail fragmentary side elevation of the right half enlarged, and showing the driving gears and sprockets with a cutter guide prong and knife in two positions as they are raised by a beet. Fig. 4 is a front elevation taken along line 4—4 of Fig. 1, with a conveyor belt and sprockets removed and showing tension guide rollers for expansion links for pressing the belts inward toward each other.

Like numerals on the different figures represent like parts. The machine comprises generally two parallel sets of duplicate parts and is supported on travelling ground wheels, 5, 5, over an axle 6. Frame work 7 is freely supported by the axle and has an extension or pole 7' by which the implement may be drawn along by any suitable tractor with the duplicate portions of the machine astride the rows of beets. Also mounted freely by journals 8' upon the axle 6 are forwardly sloping posts 8 which are spaced by cross braces 9 and 10. Suitably spaced apart and attached to the upper brace 10 and extending rearwardly are parallel rails 11 which are connected at their rear ends by cross ties 12. Projected down from the rear ends of rails 11 are braces 13 to which are attached cross ties 14 and forwardly extending rails 15. Similarly spaced forwardly extending parallel rails 16 are attached to braces 9 at their rear ends and connected in spaced relation by braces 17 near their front ends. Front cross ties 18 are connected to rails 15 by suitable risers 19 and adapted to pass over beet foliage. The right-hand end of tie 18 is connected by a pivoted link 20 to an adjusting lever 21 adapted to be latched over any notched quadrant 22 for sustaining the mechanism in suitable elevations.

Journaled in and extending through the cross tie 9, the rear ends of parallel rail 16, and the rear portion of parallel rails 15, the upper cross tie 10, and the front ends of parallel rails 11, are suitable drive shafts 23. On the lower ends of the shafts are fixed beveled pinions 24 which mesh with ring gears 25 affixed to the axle for driving the parts of the machine. At the tops of the shafts 23 are affixed suitable sprockets 26. Journaled in and extending through the rear part of the parallel rails 11 and 15 are positioned parallel shafts 27, and on the upper ends of which are affixed sprockets 28, and affixed near their lower ends are sprockets 29. Suitable conventional universal joints 30 and stub shafts 31 and driving sprockets 32 are connected to the lower ends of shafts 27. Freely mounted on the stub shafts above the sprockets 32 are parallel bars 33 which are spaced at their front ends by posts 35 and cross ties 36 to pass over the beet tops. Suitable counter balance springs 37 are connected from cross ties 36 and tops of bars 15 and carry most of the weight of the swinging bars 33, together with a cutting mechanism therewith. Prongs 38 for guiding cutters are fastened at the front ends of the bars 33. The prongs are first extended inward and horizontally for guiding the beets centrally to the cutters at predetermined positions beneath the caps of the beets. Thence the prongs extend outwardly and upwardly and forwardly, terminating in points 38' to assure passing over the tops of the varying sized beets as met in the rows, and for carrying the cutters upward to the proper position for cutting the beets. Rotatably and horizontally mounted below the front ends of the bars 33 are circular cutters 39 of suitable diameter to nearly meet in the center line of the machine for severing the beets. Attached below these cutters are sprockets 40 for belts 41 which are driven by sprocket 32 for rotating the cutters; and belts 42 connect the sprockets 28 with the sprockets 26.

Belts 43 are driven by sprocket 29 and rotate sprockets 44 which are mounted on the lower front ends of rails 15. Carrier belts 45 provided with integral spikes 51 for gripping the beets extend around sprockets 46 at the front ends of rails 16 to sprockets 47 attached to shafts 23 above the rear ends of rails 16. Suitable free rollers 48 carried on pivotally mounted links 49 are drawn toward each other where extended by springs 50 for tightening the belts 43 and 45 and compressing the same centrally toward each other for grasping the foliage of beets. The belts 43 are of suitable length so that normally they are pressed against each other, and the belts 45 are normally spaced a few inches apart for extending around the beet bodies, and are sufficiently tight to carry the beets backward against the knives with certainty but can not be free enough to permit the beets to move upwardly or downwardly while being carried along; it is, therefore, necessary as the beets vary in length to have the knives adjustable to be moved to the desired points for cutting the crowns from the beets of different lengths at a uniform distance from the caps thereof. Free turning rollers 52 may be spaced along the outer rails for supporting the outer lines of the belts.

The operation of the machine is as follows:

The implement is drawn forward by pole 7' astride a row of beets. The wheels 5 rotate the axle 6 which turns the ring gears 25 which then turn the pinion gears 24, shafts 23 and sprockets 26 and 47. The belts 45 are driven by sprockets 47 so that the inner lines are carried backwards as the machine is pulled forward. The top sprockets 26 drive the sprockets 28, shaft 27, sprockets 29, shafts 31, and sprockets 32, by means of the connecting belts 42. Belts 43 are driven by sprockets 29 at the same speed as belts 45. Belts 41 drive sprockets 40 and cutters 39. When the implement passes over the beets the foliage and stems are pinched between the belts 43 and held and thereby the beets are pulled upward and rearward by the rising slope of the belt lines and rails. As the beet is raised and carried relatively rearward, the body of the beet is pinched by the belt lines 45 and held by the spikes 51 as indicated by position A, of the beets in Fig. 3. The further travel of the beet carries it rearward and upward beneath the sloping prongs 38' and thereby raises the bars 33 and cutters 39, all of which swing from the universal joint 30 at the rear end until the beet is raised to the position shown as B, where it slides under the straight portion of the prongs 38 and is carried backward by the belts 45 and 43 between the cutters 39, and the desired portion or crown removed therefrom. After the beet is carried through the cutters, the lower portion is dropped at the rear end of chains 45. The top portions are carried further back by the chains 43 and deposited at the rear end thereof in separate locations from the lower section. The cutters by rising and falling according to the height of the beets cut off even portions although some of the beets protrude at varying heights above the carrying belts 45 and rail tracks thereof.

It will be understood that the rails and belts are first adjusted to the proper height by the lever 21 so that the upper belts will grasp the beet foliage and the lower belts and spikes will grasp and hold and move the beets backward along the same planes of the supporting rails. As the belts cannot move upward and downward, it is necessary that the knives be raised upward and downward. The prongs in front of the cutters and supporting bars first extend horizontally for sustaining the cutters in definite position with each beet when it is to be cut regardless of the positions of the beets. The prongs extending in outward and upward direction guide the beets centrally against the knives and ride over the caps of the bodies of the beets and so position the knives properly with every sized beet, the cutters being suspended by the springs at the normal height of the lowest beets permit the knives to drop to the proper position on the varying heights of beets as met in the rows.

The peripheries of the wheels 5 and of the driving sprockets respectively are preferably selected with such size and ratios that the belts will be carried backward with the same speed that the implement is moved forward; and the peripheries of the driving pinions and ring gears are selected with like ratios, all of which are shown in the drawings preferably as 5 to 1. Thus, as the beet tops are grasped by the upper belts and moved backward, they will be lifted perpendicularly and the beets moved directly upward and not dragged or passed against the soil and broken.

Having described my invention, I claim as new the following:

1. An implement for removing crowns from sugar beets, comprising a framework freely mounted on ground wheels, a pair of movable belts mounted opposite to each other, for carrying the beets backward and being synchronized in connection with the wheels for lifting the beets perpendicularly while the wheels are moving the implement forward, a lower pair of movable belts mounted opposite to each other and adapted for gripping the bodies of the beets for supporting and carrying the same backward along a fixed plane to and against cutters for removing even parts of the crowns thereof, bars hingedly connected at their rear ends and extended forward between the belts and having their front ends resiliently supported from the top of the frame, a pair of cutter discs rotatably mounted to, and below the forward end of the bars, diverging guide prongs extended forwardly and upwardly from the front ends of the bars and adapted to ride over the crowns of the beets and to guide the cutters to points of a uniform distance beneath the tops of beets of varying sizes, the rearward portion of said upper belt being projected to a point rearwardly from and above the cutters for carrying and depositing the severed crowns at points spaced from the severed bodies of the beets, and means for operating the belts and cutters, connected from the wheels.

2. An implement for cutting off crowns from sugar beets, comprising a frame freely supported on ground travelling wheels, a plurality of carrier belts rotatably mounted on driving sprockets within the frame, and driven by the wheels, for pulling up beets and moving the same backward on upwardly inclined planes, bars pivotally supported at their rear ends to permit the bars to rise and fall and supported at their front ends on springs to permit the front ends of the bars to be raised over high beet tops, and to fall to the level of lower beet tops, cutter discs rotatably mounted at the front ends of the bars across the pathway of beets when carried up the inclines, guide prongs extended forwardly from the bars for riding over the tops of all beets of varying heights, and for guiding the cutters to uniform positions on the beets beneath the tops thereof, while the beets are moved backward along fixed planes.

3. An implement for removing hard crowns from sugar beets, comprising an upper pair of oppositely positioned belts for pulling up and moving beets backward and upward, a lower pair of oppositely positioned belts for grasping the bodies of the beets and moving the same backward and upward on fixed upward inclines while the tops of the beets vary in height above the level of such inclines, bars hingedly supported at their rear ends to provide perpendicular movement of their forward ends, and said forward ends being resiliently supported to enable such front ends to be raised and to fall to meet the tops to correspond with beets of varying heights, cutters mounted beneath the front ends of said bars for severing the upper portions of the beets, prongs extended forwardly from the front ends of the bars beyond the cutters, for riding over the tops of beets of varying heights and for guiding said cutters to points on the beets of uniform distance from the tops of the beets of varying heights for severing the crowns from all beets in uniform length from the tops thereof.

ARNOLD W. KOLSTAD.